US010468927B2

(12) United States Patent
Latulipe et al.

(10) Patent No.: US 10,468,927 B2
(45) Date of Patent: Nov. 5, 2019

(54) INSERTED PERMANENT MAGNET ROTOR FOR AN EXTERNAL ROTOR ELECTRIC MACHINE

(71) Applicant: TM4 INC., Boucherville (CA)

(72) Inventors: Éric Latulipe, Ste-Julie (CA); Ruisheng Shi, Montreal (CA); Arbi Gharakhani, Verdun (CA); Martin Houle, Laval (CA); Jean-Philippe Dextraze, Delson (CA); Benjamin Martineau, Varennes (CA)

(73) Assignee: TM4, Inc., Boucherville, Quebec (CA)

( * ) Notice: Subject to any disclaimer, the term of this patent is extended or adjusted under 35 U.S.C. 154(b) by 483 days.

(21) Appl. No.: 15/304,229

(22) PCT Filed: Apr. 15, 2015

(86) PCT No.: PCT/CA2015/050311
§ 371 (c)(1),
(2) Date: Oct. 14, 2016

(87) PCT Pub. No.: WO2015/157863
PCT Pub. Date: Oct. 22, 2015

(65) Prior Publication Data
US 2017/0040856 A1    Feb. 9, 2017

Related U.S. Application Data

(60) Provisional application No. 61/979,671, filed on Apr. 15, 2014.

(51) Int. Cl.
*H02K 1/28*    (2006.01)
*H02K 21/22*    (2006.01)
*H02K 1/27*    (2006.01)

(52) U.S. Cl.
CPC ............ *H02K 1/28* (2013.01); *H02K 1/2786* (2013.01); *H02K 21/22* (2013.01)

(58) Field of Classification Search
CPC .......... H02K 1/27; H02K 1/28; H02K 1/2786; H02K 1/2793; H02K 1/30; H02K 21/22; H02K 21/222
See application file for complete search history.

(56) References Cited

U.S. PATENT DOCUMENTS 4,954,736 A * 9/1990 Kawamoto ............ H02K 1/278
310/156.21
5,397,951 A * 3/1995 Uchida .................. H02K 1/278
310/156.21
(Continued)

FOREIGN PATENT DOCUMENTS

| CN | 203014528 | | 6/2013 | |
| JP | 2002281722 A | * | 9/2002 | ............. H02K 29/03 |
| JP | 2010074951 | | 4/2010 | |

OTHER PUBLICATIONS

PCT International Search Report and Written Opinion of International Searching Authority for International Patent Application No. PCT/US2015/050311, dated Jul. 10, 2015, 7 pages.

*Primary Examiner* — Edgardo San Martin
(74) *Attorney, Agent, or Firm* — Marshall & Melhorn, LLC

(57) ABSTRACT

The external rotor for an electric machine includes a cylindrically shaped receptacle having a peripheral wall and a magnet-receiving assembly including segments assembled to the inner surface of the peripheral wall so as to define a cylindrically shaped stack. The segments are shaped so as to yield magnet-receiving portions in the ring-shaped stack, and permanent magnets are secured to the magnet-receiving portion of the magnet receiving assembly.

17 Claims, 12 Drawing Sheets

(56) References Cited

U.S. PATENT DOCUMENTS

| | | | | |
|---|---|---|---|---|
| 6,081,052 | A * | 6/2000 | Hosoe | B23K 1/19 310/12.23 |
| 6,452,301 | B1 * | 9/2002 | Van Dine | H02K 1/2773 310/156.12 |
| 6,492,755 | B1 * | 12/2002 | Jones | H02K 1/278 310/156.12 |
| 6,603,232 | B2 * | 8/2003 | Van Dine | H02K 1/2773 310/152 |
| 6,940,199 | B2 * | 9/2005 | Imamura | H02K 1/278 310/156.01 |
| 7,250,703 | B2 * | 7/2007 | Nitta | D06F 37/304 310/156.53 |
| 7,408,280 | B2 * | 8/2008 | Ooiwa | H02K 21/044 310/156.56 |
| 7,622,841 | B2 * | 11/2009 | Yoshikawa | H02K 1/276 310/156.53 |
| 7,781,932 | B2 * | 8/2010 | Jansen | H02K 1/278 310/156.08 |
| 7,816,830 | B2 * | 10/2010 | Dickes | H02K 1/148 310/156.12 |
| 7,888,835 | B2 * | 2/2011 | Yang | H02K 1/278 310/156.09 |
| 7,915,780 | B2 * | 3/2011 | Tsumagari | H01Q 9/0414 310/216.041 |
| RE43,196 | E * | 2/2012 | Kim | D06F 37/304 68/140 |
| 9,484,790 | B2 * | 11/2016 | Takahashi | H02K 9/22 |
| 9,553,487 | B2 * | 1/2017 | Seo | H02K 1/2786 |
| 10,224,773 | B2 * | 3/2019 | Mundhas | H02K 1/28 |
| 2002/0047432 | A1 * | 4/2002 | Miyashita | H02K 1/276 310/156.48 |
| 2007/0182259 | A1 * | 8/2007 | Sakata | F04C 15/008 310/90 |
| 2008/0048517 | A1 * | 2/2008 | Ochiai | H02K 1/278 310/216.004 |
| 2008/0197737 | A1 * | 8/2008 | Poulin | H02K 1/2786 310/156.08 |
| 2012/0248916 | A1 | 10/2012 | Clark | |
| 2015/0200576 | A1 * | 7/2015 | Kinashi | H02K 29/08 310/71 |
| 2016/0344246 | A1 * | 11/2016 | Fraser | B60L 50/51 |
| 2018/0233974 | A1 * | 8/2018 | Shi | H02K 1/246 |

\* cited by examiner

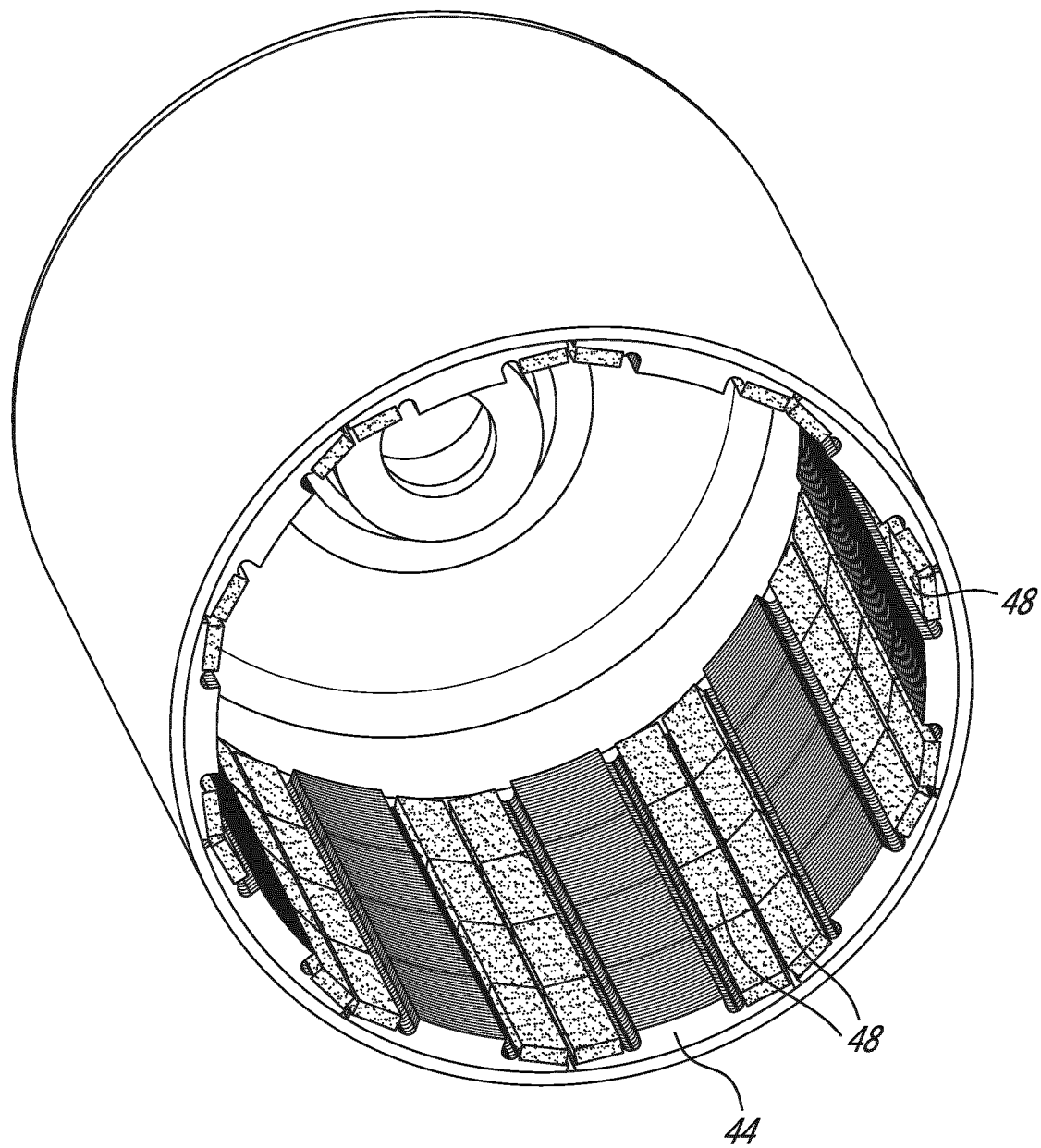

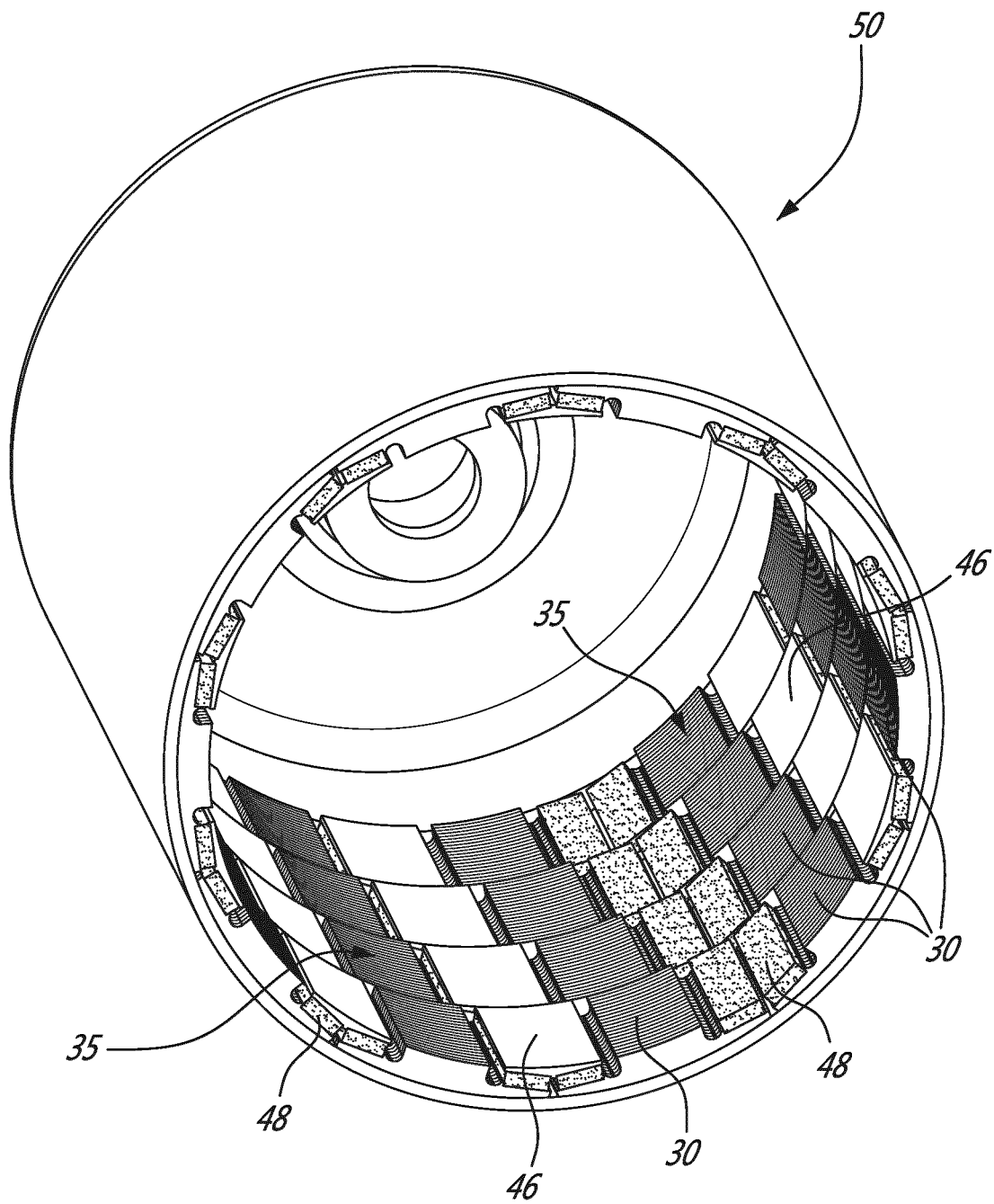

INSERTED PERMANENT MAGNET ROTOR FOR AN EXTERNAL ROTOR ELECTRIC MACHINE

CROSS REFERENCE TO RELATED APPLICATIONS

This application is a national phase under 35 U.S.C. § 371 of International Application No. PCT/CA2015/050311 filed on Apr. 15, 2015, which claims priority to and the benefit of U.S. Provisional Application No. 61/979,671 filed on Apr. 15, 2014, the disclosures of each of which are incorporated herein by reference in their entireties.

FIELD

The present disclosure generally relates to electric machines. More specifically, the present disclosure is concerned with an inserted permanent magnet (IPM) rotor for an external rotor electric machine.

BACKGROUND

The use of inserted permanent magnet (IPM) in electric machines is well known. Such technology allows the reduction of the number and/or size of magnets and has been essentially used in conventional electric machines, i.e. those including a rotor mounted into a stator for rotation coaxially therein.

It has been found desirable to provide the rotor of an external rotor electric machine with IPM.

SUMMARY

The difficulty of providing an external rotor electric machine with IPM is solved by mounting permanent magnets in a ring-shaped assembly secured to the rotor inner wall.

In accordance with an illustrative embodiment, there is provided an external rotor for an electric machine comprising a cylindrically shaped receptacle including a peripheral wall provided with an inner surface and an input/output shaft coaxial therewith. The rotor also comprises a magnet receiving assembly including elements assembled to the peripheral wall inside the receptacle so as to define a cylindrically shaped stack; the lamination elements being shaped so as to yield magnet-receiving portions in the cylindrically shaped stack; and permanent magnets secured to the magnet-receiving assembly in the magnet-receiving portions.

In accordance with another illustrative embodiment, there is provided an external rotor for an electric machine comprising a cylindrically shaped receptacle including a peripheral wall having an inner surface; a magnet receiving assembly including circular laminations assembled to the inner surface of the peripheral wall so as to define a generally cylindrically shaped stack; the laminations being so shaped as to yield magnet-receiving portions in the cylindrically shaped stack; and permanent magnets secured to the magnet-receiving portions of the magnet receiving assembly.

Other objects, advantages and features will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 3B illustrating the mounting of the lamination assembly and permanent magnets to the cylindrically shaped receptacle thereof;

FIG. 4 is a perspective view of an external rotor according to a second illustrative embodiment;

FIG. 5 is a perspective view of an external rotor according to a third illustrative embodiment;

FIG. 7B illustrating the mounting of the lamination assembly and permanent magnets to the cylindrically shaped receptacle of the external rotor;

DETAILED DESCRIPTION

Figure 1:
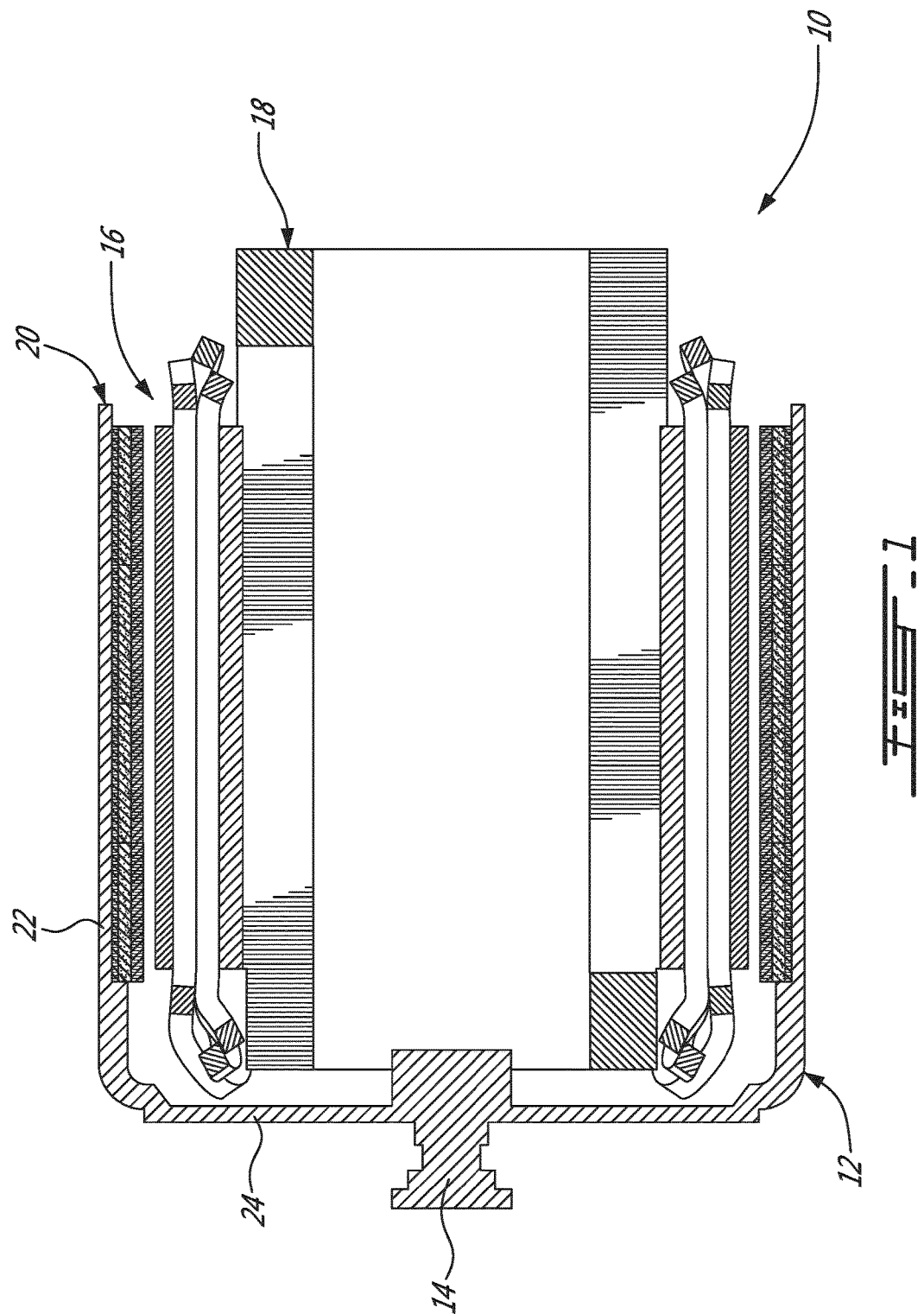
FIG. 1 is a cross section of an external rotor electric machine according to a first illustrative embodiment.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "electric machine" should be broadly construed herein and in the appended claims so as to include electric motors, electric generators and the like.

The expression "connected" should be broadly construed herein and in the appended claims so as to include any cooperative or passive association between mechanical parts or components. For example, such parts may be connected together by direct coupling, or indirectly coupled using further parts therebetween.

With reference first to FIGS. 1, 2, 3A and 3B of the appended drawings, a first illustrated embodiment of an external rotor electric machine 10 will now be described.

The external rotor electric machine 10 comprises an external rotor 12 provided with an integral coaxial hub 14, and internal stator 16 mounted to the rotor 12 coaxially therein for rotation of the rotor 12 thereabout, and a generally cylindrical cooling member 18 secured to the stator 16 therein.

It is to be noted that the stator 16 is not limited to the illustrated embodiment. Since stators are believed to be well known in the art, the stator 16 will not be further described herein for concision purposes.

The external rotor 12 comprises a cylindrically shaped receptacle 20 including a peripheral wall 22 and an integral cap 24 provided at its longitudinal end 26. The hub 14 is provided in the cap 24 coaxially with the wall 22. The hub 14 allows receiving an input/output shaft (not shown) internally or externally with respect to the receptacle.

The rotor 12 further includes i) a magnet receiving assembly 28, including segments 30 that are assembled into a cylindrically shaped stack and secured to the peripheral wall 22 inside the receptacle 20, and ii) permanent magnets 32 that are secured to the magnet receiving assembly 28. For that purpose, the segments 30 are shaped so as to yield magnet-receiving portions therein.

Figure 2:
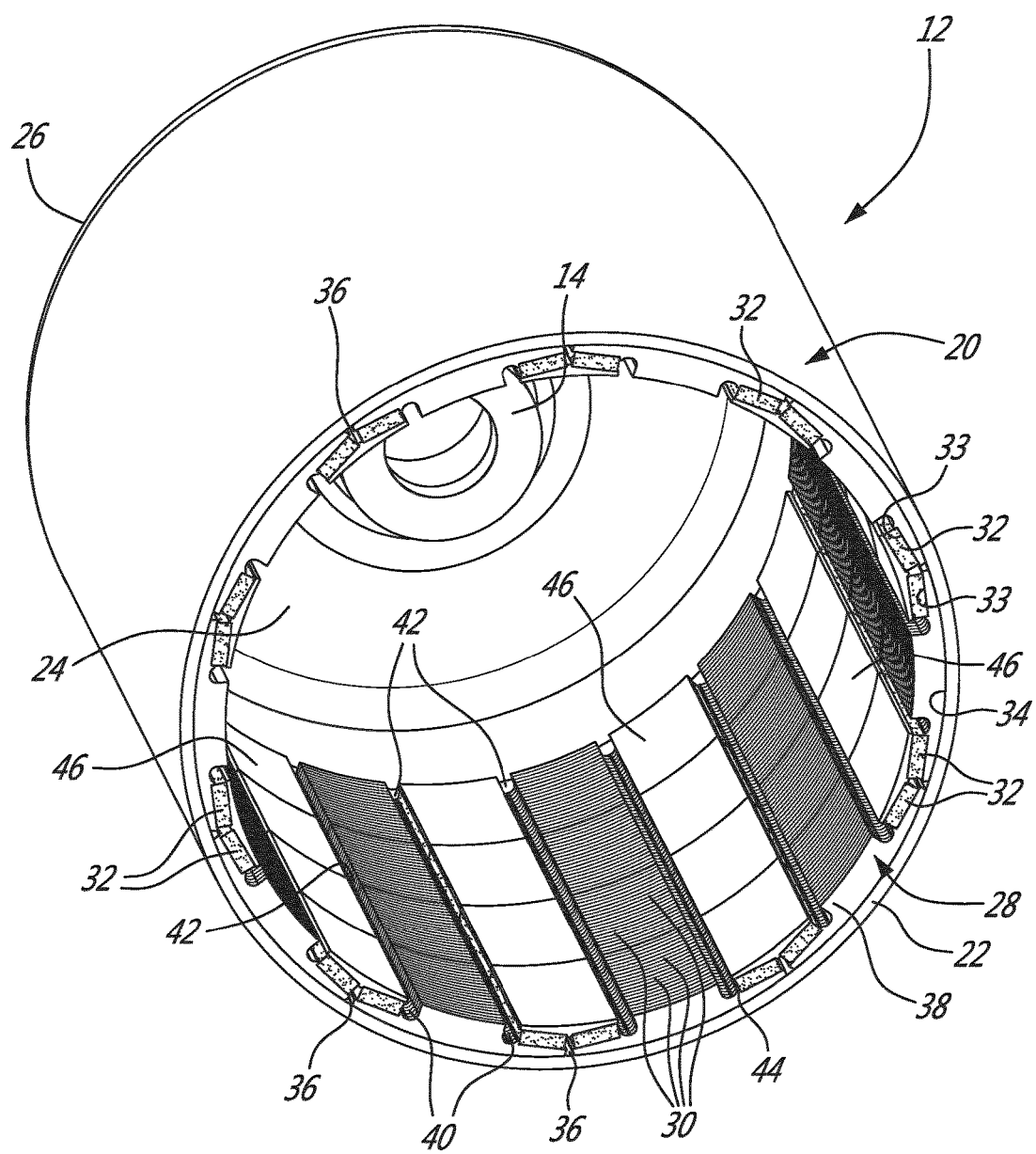
FIG. 2 is a perspective view of the rotor of the electric machine from FIG. 1.

According to the first illustrative embodiment, the segments 30 are made of a plurality of laminations, as can be better seen from FIG. 2. The segments 30 are in the form of ring sections resulting for example from stamping or cutting strips of magnetically susceptible material. Of course, the segments 30 may result from other manufacturing processes.

Prior to their mounting onto the inner surface 34 of the peripheral wall 22, the laminations are pre-assembled into the segments 30 and a permanent magnet 32 is positioned in each of the two lateral magnet-receiving portions formed in the segment 30.

According to the first illustrative embodiment, the segments 30 have a thickness equivalent to the height of the magnets received therein. According to another embodiment (not shown), each lateral side of a segment 30 receives two or more abutted permanent magnets.

The segments 30 are assembled for example by using a partial and local deformation (not shown) of the laminations achieved by punching. The permanent magnets 32 are secured to the segments 30 using an adhesive. The resulting segment is secured to the inner surface 34 of the receptacle 20 using an adhesive. Other fastening means can also be used, such as other mechanical or chemical fastening, including soldering.

According to another embodiment, the permanent magnets 32 are directly positioned onto the segments 30 without an adhesive.

As can be seen from FIG. 2, the ring segments 30 are so shaped as to define a central protrusion 38 that is shaped so as to yield two rounded notches 40 between the central protrusion and respective lateral magnet-receiving portions 33. Within a segment 30, the notches 40 together define a channel 42 between the central protrusion and respective magnets 32 that prevents the magnetic field to directly go from the magnets 32 to the central protrusions 38. Each notch 40 defines, with the magnet-receiving portion 33, a small shoulder that helps positioning and maintaining in place the magnet 32.

The segments 30 are dimensioned so as to yield a small angular gap 36 between adjacent segments 30 when they are assembled on the inner surface 34 of the receptacle 20. This eases their mounting onto the receptacle 20 from a radial direction (see arrow 48 in FIG. 3B).

Figure 3A:
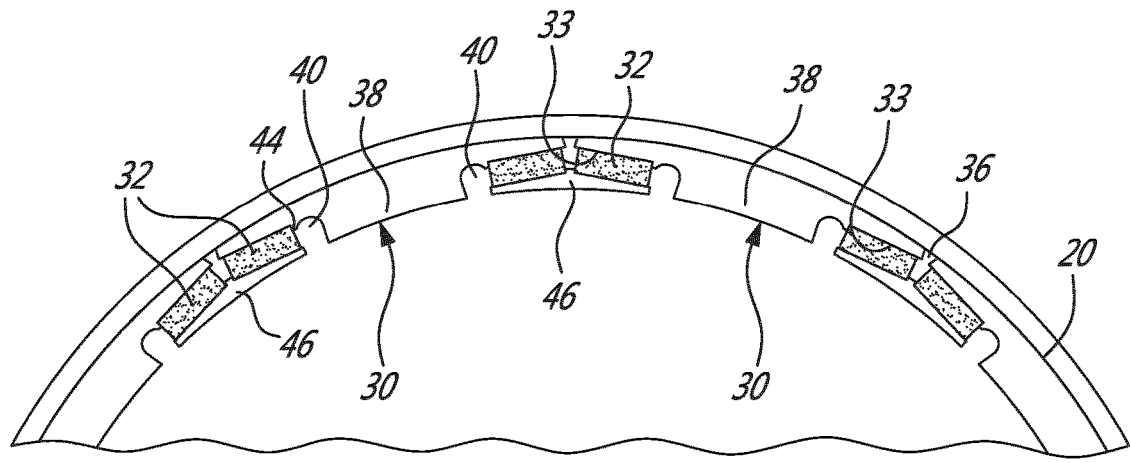
FIGS. 3A and 3B are top plan view of the external rotor from FIG. 2.
Figure 3B:
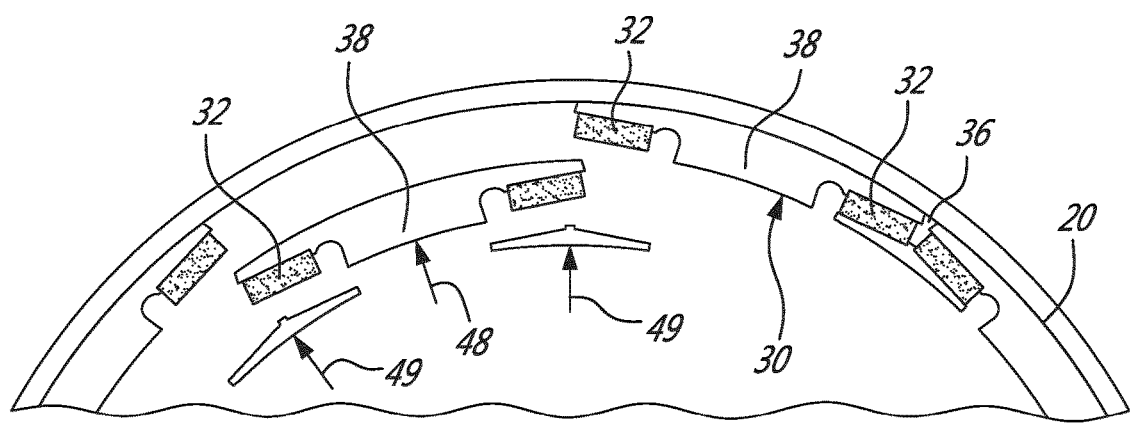

Caps 46 are provided onto adjacent magnets 32 of two adjacent segments 30 (see arrow 49 in FIG. 3B). The caps 46 are made of magnetic powder, which allows a functional magnetic permeability and a low electric conductivity. A person skilled in the art will also appreciate that there is no direct connection between the caps 46 and the segments 30, thereby preventing magnetic short circuit. It will also be apparent to one skilled in the art that the caps 46 could be made of stacks of laminations or of other soft magnetic material (SMC).

The thickness and configuration of the magnets 32, caps 46, and segments 30 are such that the resulting assembly 28 yields a generally evenly rounded surface of the rotor 12, with the exception of the channels 42, thereby improving the electric machine efficiency.

Both the inner surface 34 of the receptacle 20 and the facing contacting side of the segments 30 can be provided with cooperating guiding elements such as tongues and grooves (not shown) to help position and assemble the segments 30 within the receptacle 20.

Since the permanent magnets 32 are mounted to the receptacle 20 of the rotor 12 via a magnet receiving assembly made of magnetically susceptible material, the receptacle 20 itself is not limited to being made from magnetically susceptible metals and can be made of other materials such as plastics, other metals such as aluminum and fiber reinforced plastics, amongst others.

FIG. 4 shows an external rotor for an external rotor electric machine according to a second illustrative embodiment wherein the caps 46 are omitted.

FIG. 5 shows an external rotor 50 for an electric machine according to a third illustrative embodiment. Since the rotor 50 is similar to the rotor 12, only the differences therebetween will be described hereinbelow in more detail for concision purposes. It is to be noted that some of the caps 46 have been omitted only to alleviate the drawing.

According to this embodiment, a first row of segments 35 is assembled to the receptacle 20 inside thereof and the next adjacent row is similarly assembled to the receptacle 20 so as to be angularly shifted with regards to the previous adjacent row. While this angular shift is of three (3) degrees according to the third embodiment, other angular shift angles can also be foreseen.

This shifting from one row of segments to the next has been found to cancel harmonics and to reduce cogging torque.

Figure 6:
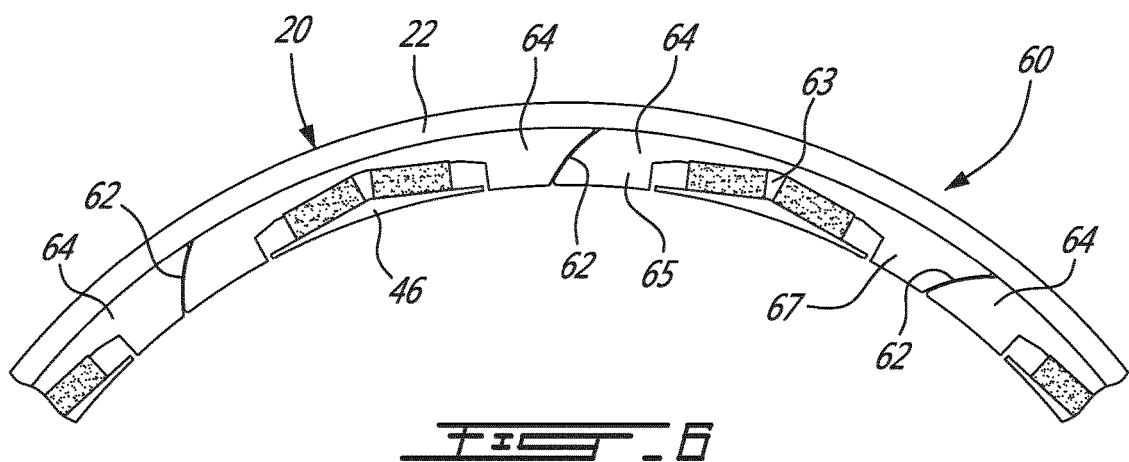
FIG. 6 is a broken away top plan view of a lamination assembly with permanent magnets secured thereto, both parts of an external rotor according to a fourth illustrative embodiment.

FIG. 6 shows an external rotor 60 for an electric machine according to a fourth illustrative embodiment. Since the rotor 60 is similar to the rotor 12, only the differences therebetween will be described herein in more detail for concision purposes.

According to this fourth embodiment, each segment 64 is provided with a central magnet-receiving portion 63 and with two lateral protrusions 65, 67.

The angular gap 62 between two consecutive segments 64 is minimized by providing segments 64 that have complimentary abutting surfaces. More specifically, the lateral sides of the segments are cut at non-orthogonal complimentary angles or curves. This allows positioning a segment 64 onto the peripheral wall 22 of the cylindrically shaped receptacle 20 by abutting a first end of a segment 64 with the opposite end of the adjacent segment, and then by pivoting the segment in place with the already positioned end thereof as a pivot.

Figure 7A:
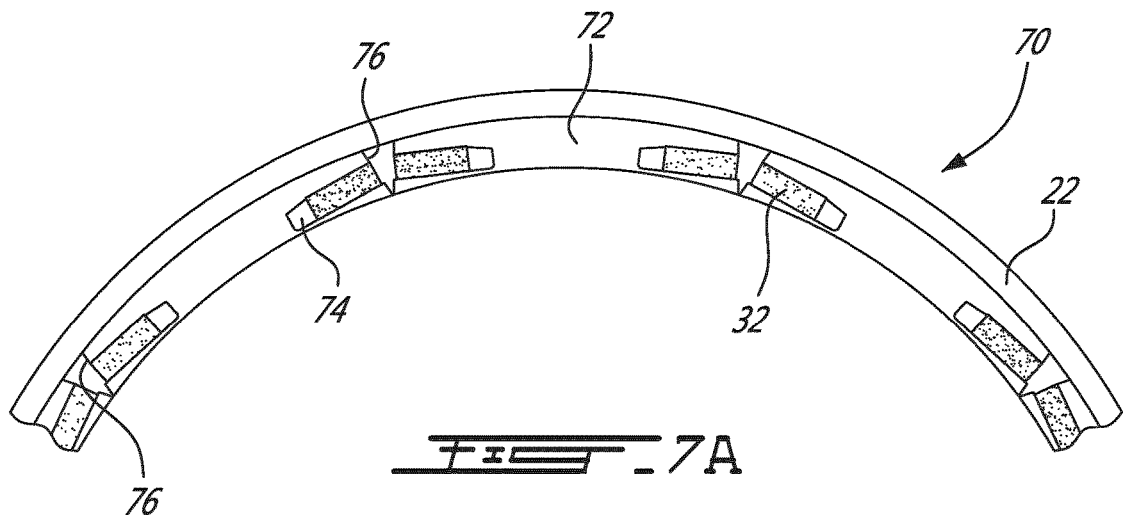
FIGS. 7A and 7B are broken away top plan views of a lamination assembly with permanent magnets secured thereto, both parts of an external rotor according to a fifth illustrative embodiment.
Figure 7B:
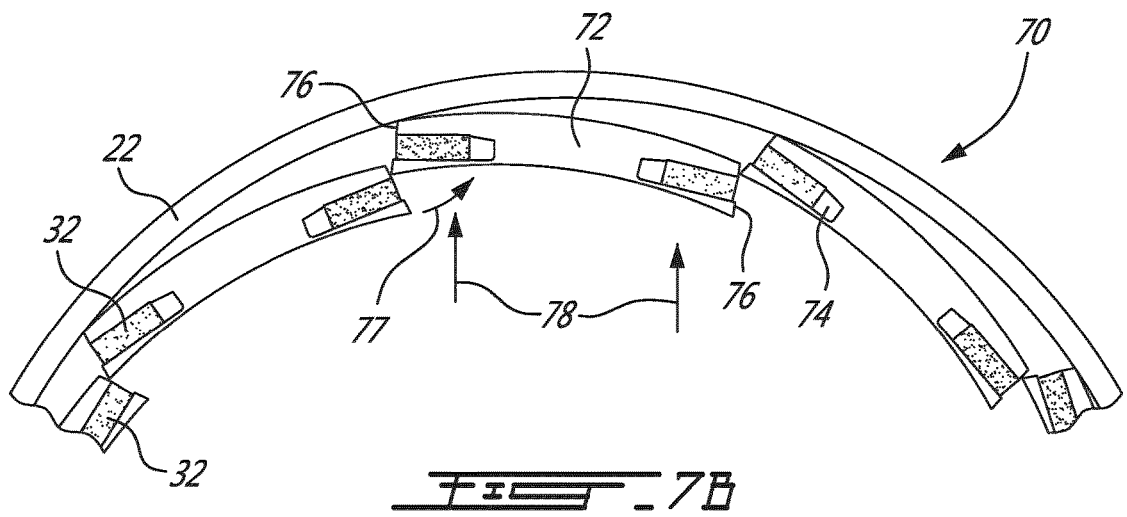

With reference now to FIGS. 7A-7B, an external rotor 70 for an electric machine according to a fifth illustrative embodiment will now be described. Since the rotor 70 is similar to the rotor 12, only the differences therebetween will be described herein in more detail for concision purposes.

The permanent magnet-receiving portions of the segments 72 are in the form of generally rectangular cuts 74 opened on each lateral side 76 of the segments 72 defining magnet-receiving grooves therein. With this configuration, a permanent magnet 32 is inserted in such a groove from the side. This has been found as requiring less adhesive grating after mounting the magnet 32 in the groove. However, as can be seen in FIG. 7B, the lamination segments 72 cannot be mounted radially. Lamination segments 72 are assembled by tilting (see arrow 77) and then pushing thereon (see arrows 78). It is to be noted that the caps 46 are integral with the segments 72 and that the gap between two adjacent magnets 32 is increased.

Figure 8A:
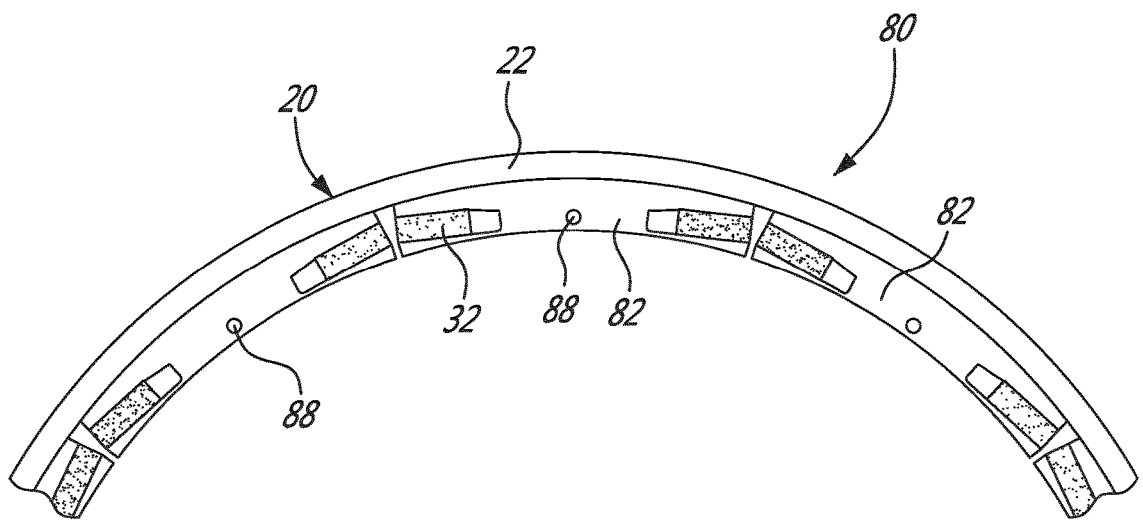
FIGS. 8A and 8B are broken away top plan views of a lamination assembly with permanent magnets secured thereto, both parts of an external rotor according to a sixth illustrative embodiment, FIG. 8B illustrating the mounting of the lamination assembly and permanent magnets to the cylindrically shaped receptacle of the external rotor.
Figure 8B:
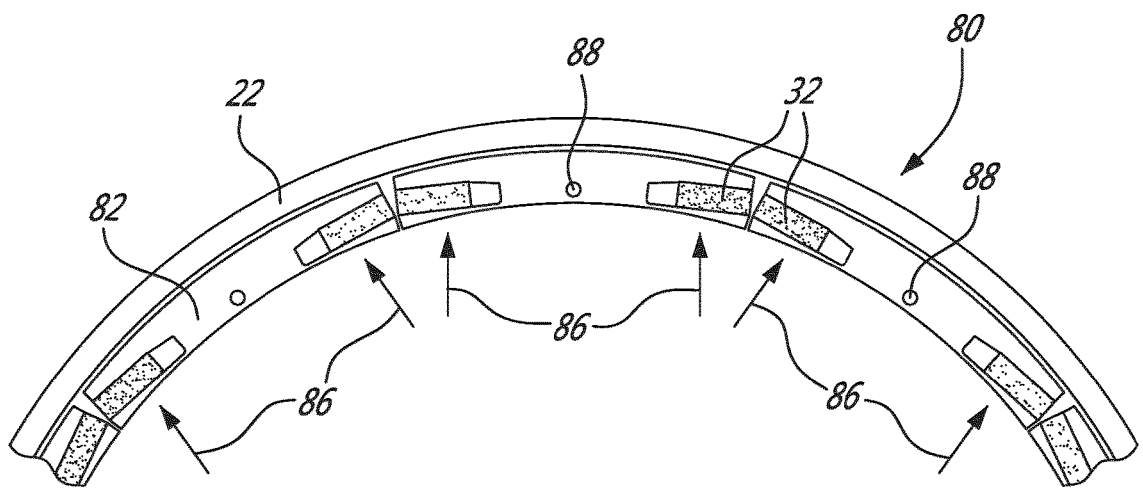

FIGS. 8A-8B show a sixth embodiment of an external rotor 80 for an electric machine. The external rotor 80 is very similar to the rotor 70 with, as differences, that the lamination segments 82 are shorter, leaving a gap 84 therebetween facilitating their mounting to the receptacle 20 from a radial direction (see arrows 86). However the greater gap 84 is to the detriment to the ease of positioning. To cope with this additional challenge, circular holes 88 are provided at a same position in all lamination segments 82, which can be used to align all stacked segment 82. The holes 82 can be used as visual guides or to receive pins (not shown) to force the alignment of the segments 82 when they are abutted to the peripheral wall 22.

Figure 9A:
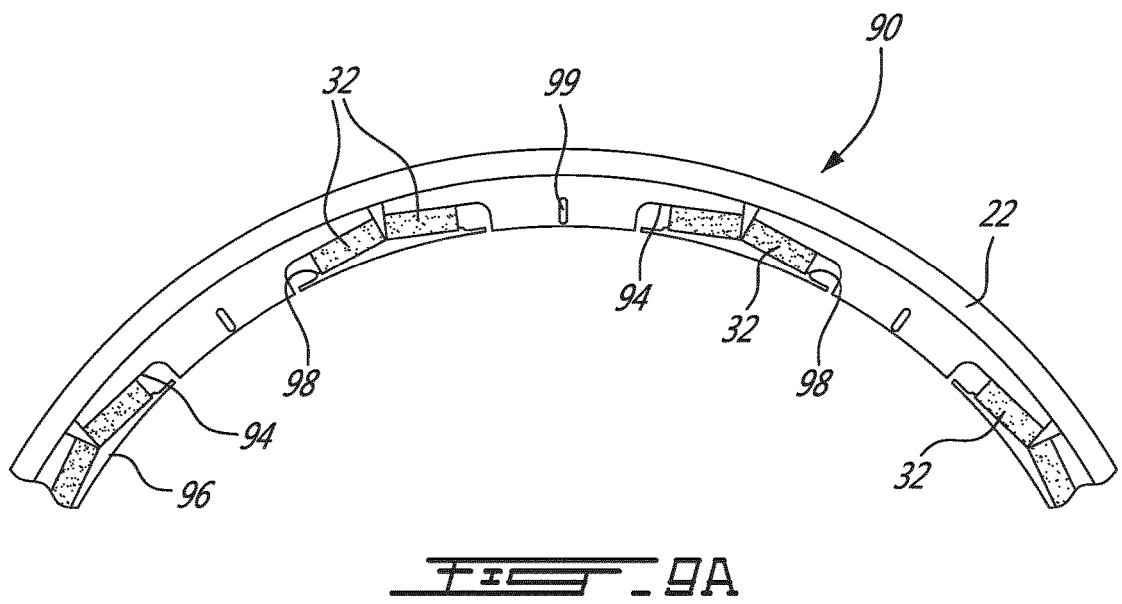
FIGS. 9A and 9B are broken away top plan views of a lamination assembly with permanent magnets secured thereto, both parts of an external rotor according to a seventh illustrative embodiment, FIG. 9B illustrating the mounting of the lamination assembly and permanent magnets to the cylindrically shaped receptacle of the external rotor.
Figure 9B:
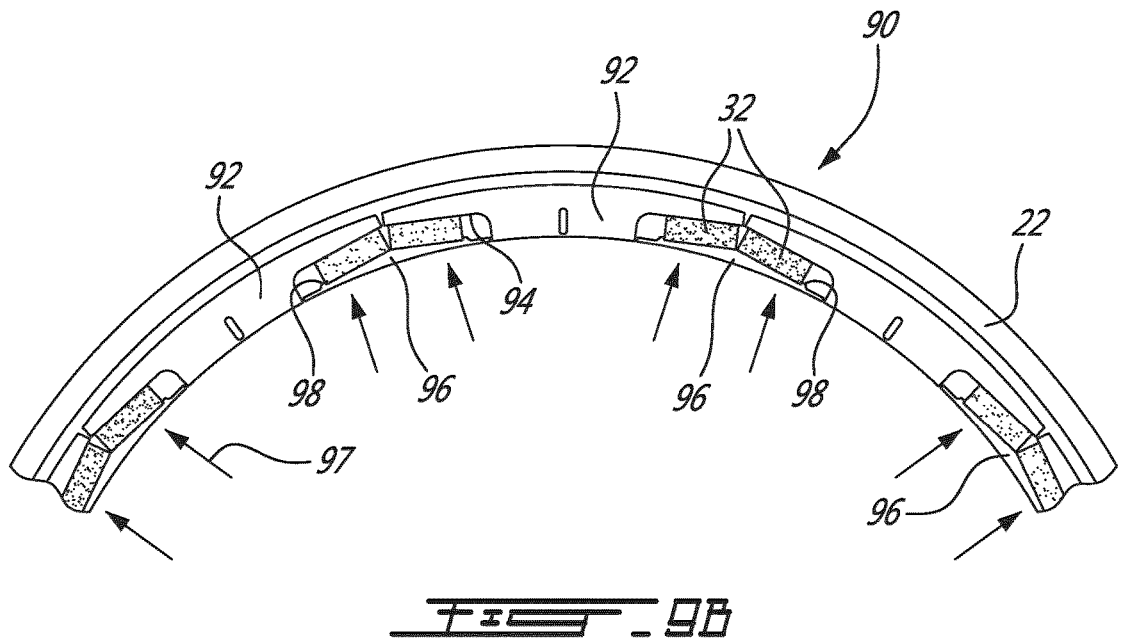

An external rotor 90 according to a seventh embodiment is shown in FIGS. 9A-9B. Compared to the embodiment shown in FIGS. 1, 2, 3A-3B, the permanent magnets 32 on facing sides of two adjacent segments 92 are secured in respective magnet-receiving portions 94 so that the permanent magnets are in contact. A cap 96 is secured onto the pair of contacting adjacent magnets 92 as described hereinabove. The cap 96 includes two lateral shoulders 98 that are shaped and positioned so as to force the two facing magnets 32 into contact and prevent their displacement within the magnet-receiving portions 94. Similarly to the embodiment shown in FIGS. 8A-8B, the segments include holes 99 for alignment. The holes 99 are oval-shaped. The shape of the lamination segments 92 allows their mounting to the peripheral wall 22 from the radial direction (see arrows 97).

Figure 10A:
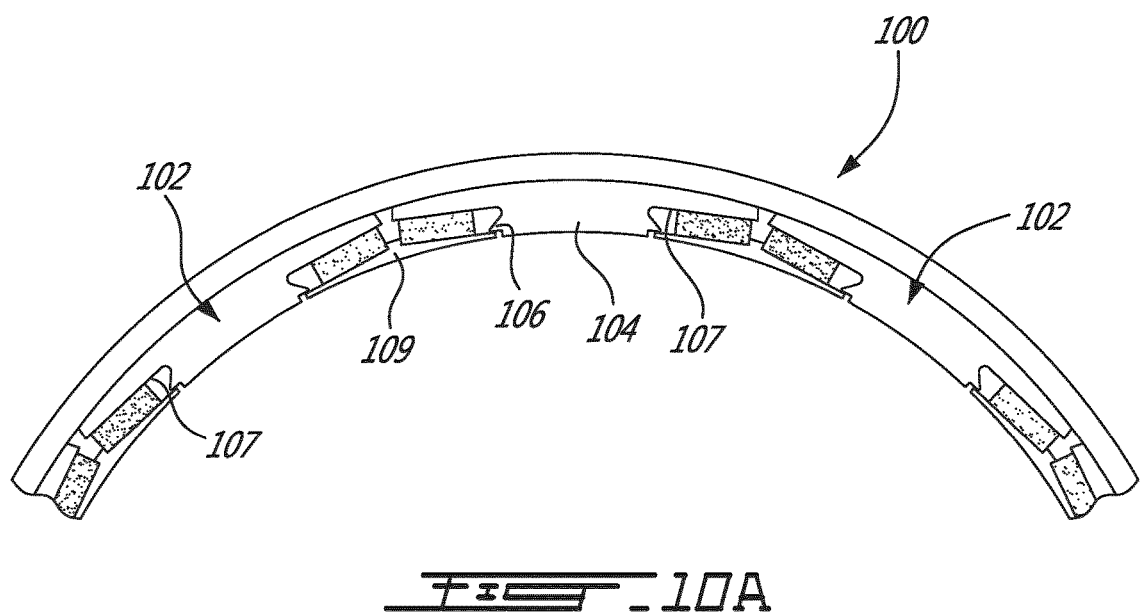
FIGS. 10A and 10B are broken away top plan views of a lamination assembly with permanent magnets secured thereto, both parts of an external rotor according to a eighth illustrative embodiment, FIG. 10B illustrating the mounting of the lamination assembly and permanent magnets to the cylindrically shaped receptacle of the external rotor.
Figure 10B:
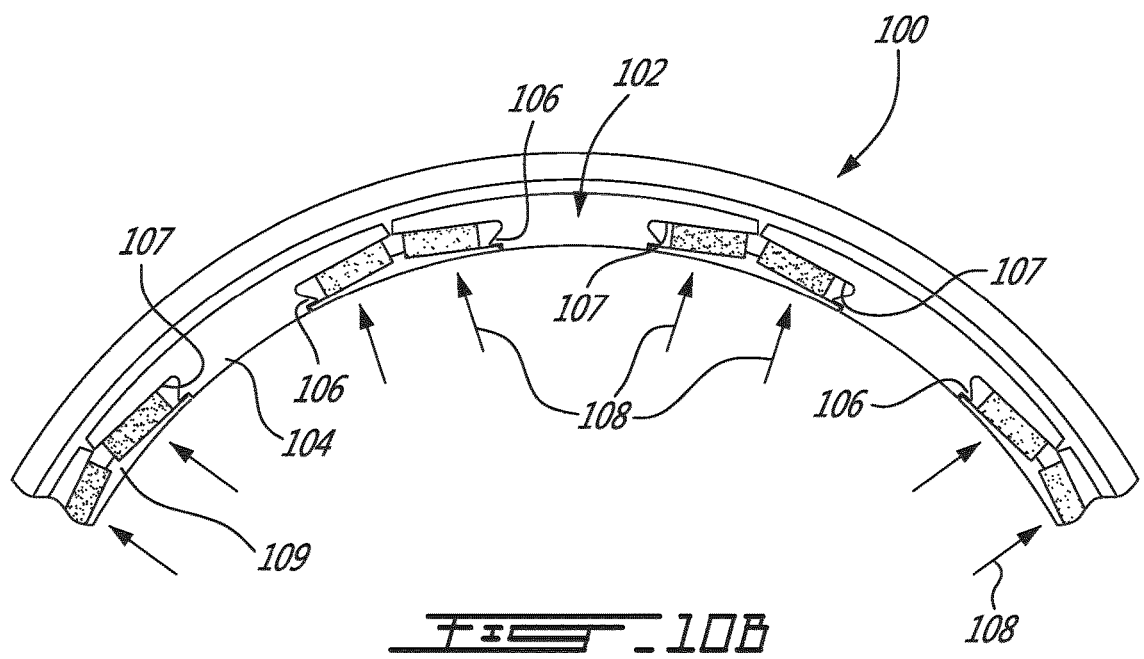

An external rotor 100 according to an eighth embodiment, which is shown in FIGS. 10A-10B, differs from the first embodiment by including lamination segments 102 whose central protrusion 104 includes two (2) small lips 106, each extending within a respective magnet-receiving portion 107.

The lips 106 are contacted by the caps 109. As illustrated by the arrows 108, the lamination segments are positioned radially.

Figure 11A:
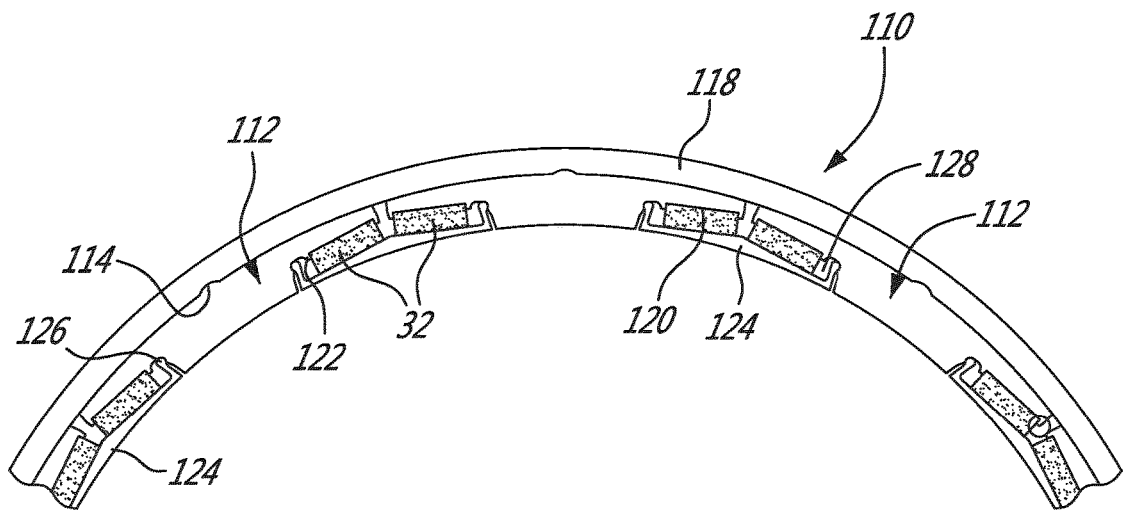
FIGS. 11A and 11B are broken away top plan views of a lamination assembly with permanent magnets secured thereto, both parts of an external rotor according to a ninth illustrative embodiment, FIG. 11B illustrating the mounting of the lamination assembly and permanent magnets to the cylindrically shaped receptacle of the external rotor.
Figure 11B:
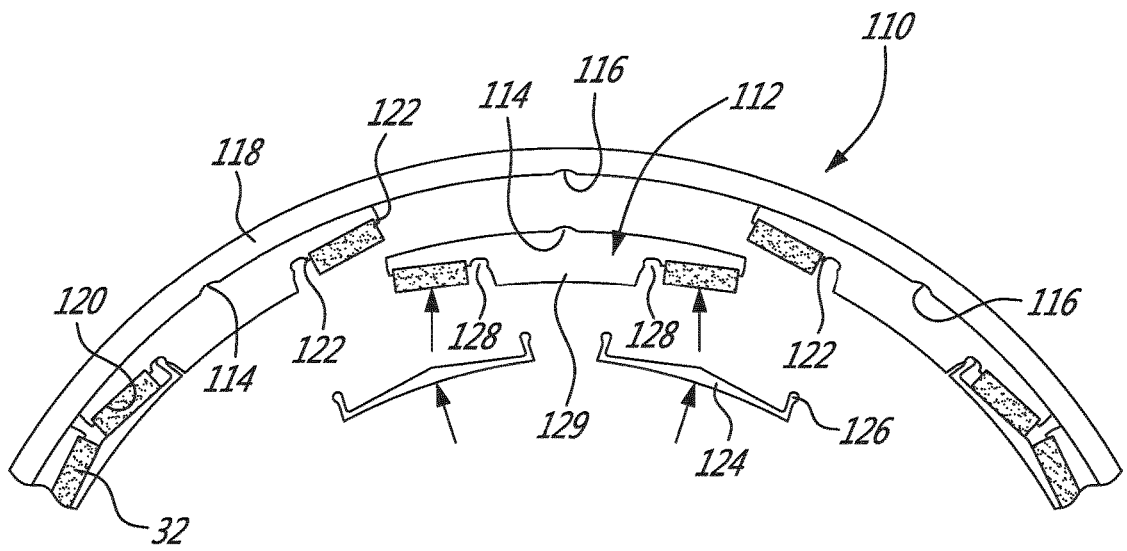

The ninth illustrative embodiment of an external motor 110 shown in FIGS. 11A-11B is similar to the first embodiment, and only the differences therebetween will be described herein in more detail for concision purposes.

As a first difference, each lamination segment 112 includes a bulge 114 that cooperates with a complementary groove 116 in the peripheral wall 118 of the receptacle to fix the position of the segments 112 relative to the peripheral wall 118 and to helps transfer the torque to the rotor.

The magnet-receiving portions 120 are defined by two pairs of shoulders 122 in the lamination segments 112 on respective lateral side thereof.

The caps 124 are so configured as to be snapped to adjacent lamination segments over consecutive permanent magnets 32. For this purpose, the caps 124 include tongues 126 on each lateral side thereof that cooperate with corresponding notches 128 provided on the segments 112 between the portions 120 and the central protrusion 129. Of course, the notches 128 define grooves within a stack of segments 112. No adhesive is used to secure the caps 124 to the segments 112.

Figure 12A:
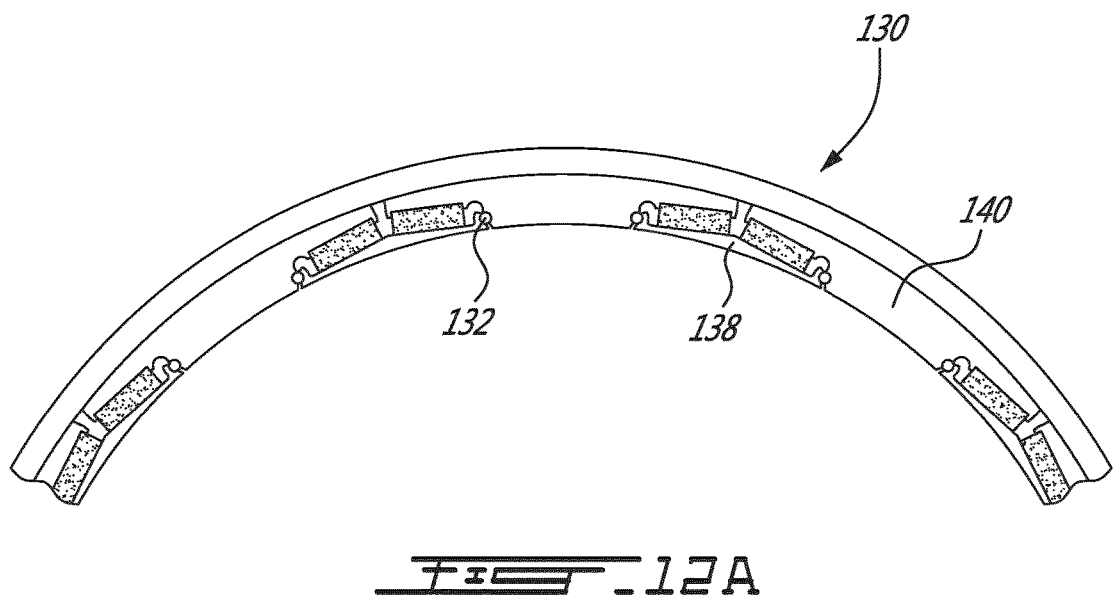
FIGS. 12A and 12B are broken away top plan views of a lamination assembly with permanent magnets secured thereto, both parts of an external rotor according to a tenth illustrative embodiment, FIG. 12B illustrating the mounting of the lamination assembly and permanent magnets to the cylindrically shaped receptacle of the external rotor.
Figure 12B:
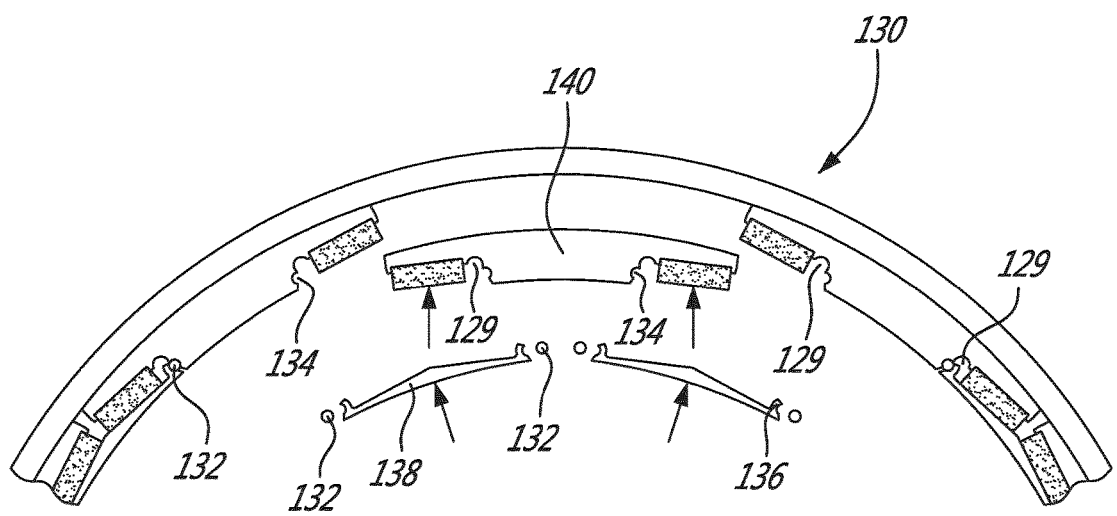

An external rotor 130 for an electric machine according to a tenth illustrative embodiment will now be described with reference to FIGS. 12A-12B. Since the rotor 130 is similar to the rotor 110, only the differences therebetween will be described herein in more detail for concision purposes.

In addition to the tongue and groove arrangements shown in FIGS. 11A-11B, the external rotor 130 includes biasing members in the form of pre-loaded springs 132 that are positioned in secondary notches 134 provided in the main notches 129. The tongues 136, which are similar to the tongues 126, are arcuate, thereby defining spring-receiving recesses therein that come into contact with the springs 132 when the caps 138 are mounted to the stack of segments 140.

Figure 13:
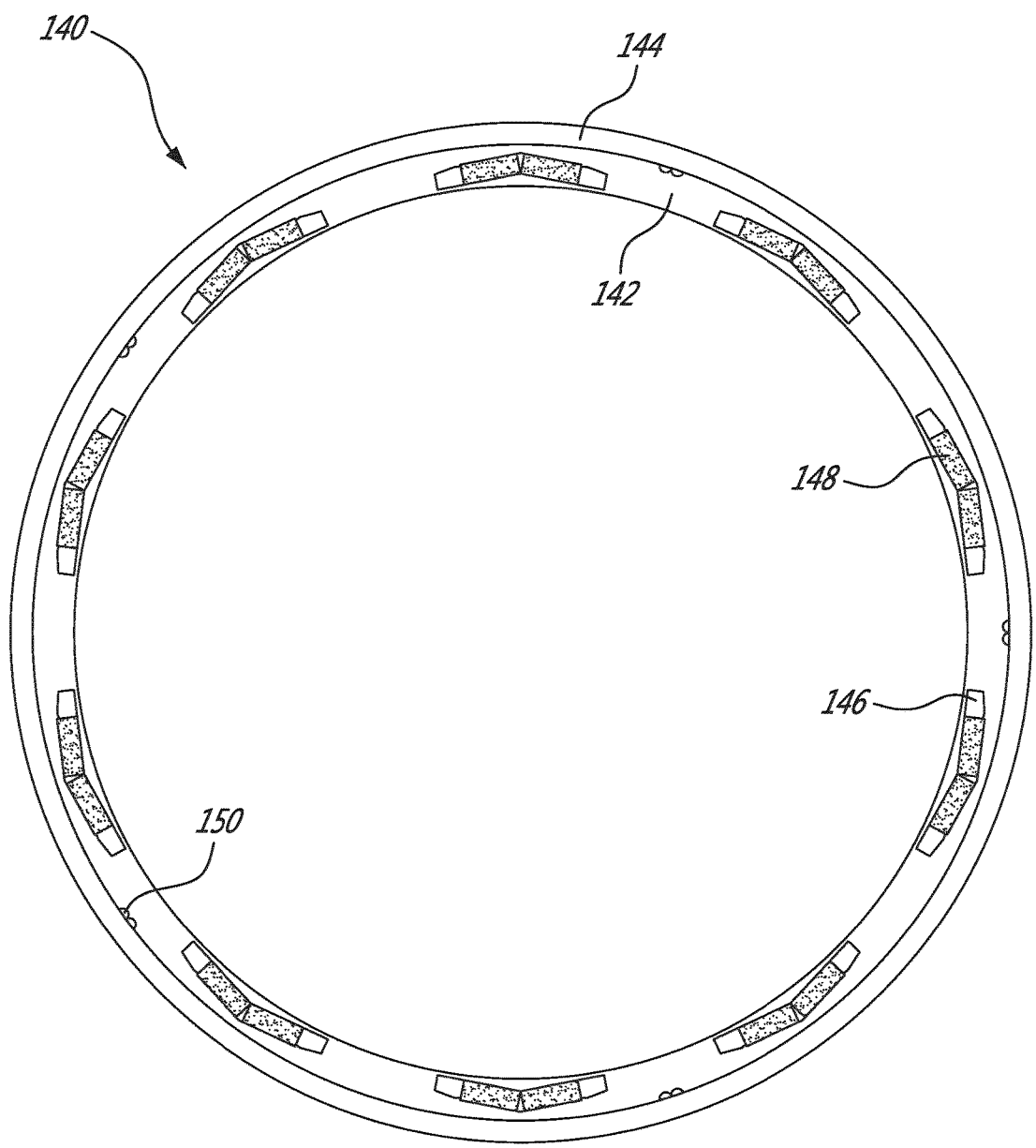
FIG. 13 is a top plan view of a lamination assembly with permanent magnets secured thereto according to an eleventh illustrative embodiment.

Finally, an external rotor 140 or an electric machine according to an eleventh illustrative embodiment will now be described with reference to FIG. 13. Since the rotor 140 is similar to the various rotors described above, only the differences therebetween will be described herein in more detail for concision purposes.

The main difference between the rotor 140 and the above-described rotors relates to the laminations 142 that are circular and fitted in the cylindrically shaped receptacle 144. Glue (not shown) may be used to secure the stack of laminations 142 in the receptacle 144.

The stack of laminations 142 include longitudinal apertures 146 configures and sized to receive permanent magnets 148 therein.

Grooves 150 are provided in the laminations 142 to allow room for excess adhesive.

One skilled in the art will understand that other configurations of an inserted permanent magnet rotor for an external rotor electric machine using some of the various features of the above-described illustrative embodiments can be designed.

One skilled in the art will also understand that while the segments forming the magnet-receiving assembly have been described hereinabove as being made of a stack of laminations, these segments could be made of blocks of compressed magnetic powders that have suitable magnetic properties. Or course, other soft magnetic materials (SMC) could be used to form the magnet receiving assembly.

It is to be understood that the inserted permanent magnet rotor for an external rotor electric machine is not limited in its applications to the details of construction and parts illustrated in the accompanying drawings and described hereinabove. The inserted permanent magnet rotor for an external rotor electric machine is capable of other embodiments and of being practiced in various ways. It is also to be understood that the phraseology or terminology used herein is for the purpose of description and not limitation. Hence, although the inserted permanent magnet rotor for an external rotor electric machine has been described hereinabove by way of illustrative embodiments thereof, it can be modified, without departing from the spirit, scope and nature of the subject invention.

The invention claimed is:

1. An external rotor for an electric machine comprising:
a cylindrically shaped receptacle including a peripheral wall having an inner surface;
a magnet receiving assembly including segments assembled to the inner surface of the peripheral wall so as to be adjacent and to define a generally cylindrically shaped stack;
the segments being shaped so as to yield magnet-receiving portions in the cylindrically shaped stack;
permanent magnets secured to the magnet-receiving portions of the magnet receiving assembly; and
caps mounted to adjacent magnets provided on adjacent segments of the magnet-receiving assembly;
wherein the segments forming the magnet-receiving assembly includes a central protrusion and two lateral magnet-receiving portions; and
wherein the caps are made of magnetically permeable material such that there is no direct connection between the caps and the segments.

2. The external rotor of claim 1, wherein the segments forming the magnet receiving assembly are made of a stack of laminations.

3. The external rotor of claim 2, wherein the stacks of laminations forming the segments are maintained together by partial and local deformation.

4. The external rotor of claim 1, wherein the segments forming the magnet receiving assembly are defined by blocks of magnetic powder material.

5. The external rotor of claim 1, wherein the cylindrically shaped receptacle includes an integral cap and a hub coaxially therewith and configured to receive an input/output shaft.

6. The external rotor of claim 1, wherein each segment further includes two rounded notches respectfully provided between the central protrusion and the lateral magnet-receiving portions.

7. The external rotor of claim 1, wherein each lateral magnet-receiving portion includes a magnet positioning shoulder against which a magnet is abuttable.

8. The external rotor of claim 1, wherein the caps include shoulders against which magnets are abuttable.

9. The external rotor of claim 1, wherein the caps and the segments include corresponding tongue and notches allowing the caps to be mounted to adjacent segments.

10. The external rotor of claim 9, further comprising preloaded springs installable between the corresponding tongue and notches to secure the caps to the adjacent segments.

11. The external rotor of claim 1, wherein each segment includes a central protrusion and lateral sides provided with generally rectangular grooves defining magnet-receiving portions.

12. The external rotor of claim 1, wherein each segment is provided with a central magnet-receiving portion and with two lateral protrusions.

13. The external rotor of claim 12, wherein the segments are provided with complimentary abutting surfaces.

14. The external rotor of claim 1, wherein the cylindrically shaped stack is defined by more than one row of adjacently assembled segments.

15. The external rotor of claim 14, wherein the consecutive rows forming the cylindrically shaped stack are angularly shifted.

16. The external rotor of claim 1, wherein the cylindrically shaped receptacle is made of a material selected from the group consisting of plastics, aluminum, non-magnetically susceptible allows and fiber reinforced plastics.

17. An external rotor for an electric machine comprising:
a cylindrically shaped receptacle including a peripheral wall having an inner surface;
a magnet receiving assembly including circular laminations assembled to the inner surface of the peripheral wall so as to define a generally cylindrically shaped stack;
the laminations being so shaped as to yield magnet-receiving portions in the cylindrically shaped stack;
permanent magnets secured to the magnet-receiving portions of the magnet receiving assembly; and
caps mounted to adjacent magnets provided on adjacent segments of the magnet-receiving assembly;
wherein the segments forming the magnet-receiving assembly includes a central protrusion and two lateral magnet-receiving portions; and
wherein the caps are made of magnetically permeable material such that there is no direct connection between the caps and the segments.

* * * * *